US012726035B2

(12) United States Patent
Hock

(10) Patent No.: US 12,726,035 B2
(45) Date of Patent: Sep. 1, 2026

(54) SYSTEM AND METHOD FOR BALANCING ULTRACAPACITORS EMPLOYING A SWITCHED CHARGE SHUTTLING CAPACITOR

(71) Applicant: AVX Corporation, Fountain Inn, SC (US)

(72) Inventor: Joseph M. Hock, Surfside Beach, SC (US)

(73) Assignee: KYOCERA AVX Components Corporation, Fountain Inn, SC (US)

( * ) Notice: Subject to any disclaimer, the term of this patent is extended or adjusted under 35 U.S.C. 154(b) by 176 days.

(21) Appl. No.: 17/325,400

(22) Filed: May 20, 2021

(65) Prior Publication Data

US 2021/0408807 A1 Dec. 30, 2021

Related U.S. Application Data

(60) Provisional application No. 63/045,887, filed on Jun. 30, 2020.

(51) Int. Cl.
*H02J 7/56* (2026.01)
*B60L 58/22* (2019.01)
(Continued)

(52) U.S. Cl.
CPC ................ *H02J 7/56* (2026.01); *B60L 58/22* (2019.02); *H02J 7/345* (2013.01); *H02J 7/52* (2026.01);
(Continued)

(58) Field of Classification Search
CPC ...... H02J 7/0019; H02J 7/0014; H02J 7/0016; H02J 7/0018; H02J 7/345; H02J 2207/50; H02J 7/56; Y02E 60/13; B60L 58/22
(Continued)

(56) References Cited

U.S. PATENT DOCUMENTS 5,710,504 A * 1/1998 Pascual ................ H02J 7/0018 307/77
5,932,932 A 8/1999 Agatsuma et al.
(Continued)

FOREIGN PATENT DOCUMENTS

CN 101359837 A 2/2009
CN 108512239 A * 9/2018 ............. B60L 55/00
(Continued)

OTHER PUBLICATIONS

International Search Report and Written Opinion for PCT/US2021/033346 dated Sep. 9, 2021, 7 pages.
(Continued)

*Primary Examiner* — John T Trischler
(74) *Attorney, Agent, or Firm* — Dority & Manning, P.A.

(57) ABSTRACT

A system for balancing ultracapacitors includes a balancing capacitor and a plurality of switching devices. The system further includes a control circuit. The control circuit is communicatively coupled to each of the plurality of switching devices. The control circuit is configured to control operation of a first pair of the switching devices to couple the balancing capacitor across a first ultracapacitor of a plurality of ultracapacitors to transfer electrical charge from the first ultracapacitor to the balancing capacitor. The control circuit is further configured to control operation of a second pair of the switching devices that is different than the first pair to couple the balancing capacitor across a second ultracapacitor of the plurality of ultracapacitors to transfer at least a portion of the electrical charge from the balancing capacitor to the second ultracapacitor.

10 Claims, 6 Drawing Sheets

(51) Int. Cl.
*H02J 7/34* (2006.01)
*H02J 7/52* (2026.01)
*H02J 7/54* (2026.01)

(52) U.S. Cl.
CPC ............. *H02J 7/54* (2026.01); *H02J 2207/50* (2020.01); *Y02E 60/13* (2013.01)

(58) Field of Classification Search
USPC .......................................................... 320/167
See application file for complete search history.

(56) References Cited

U.S. PATENT DOCUMENTS 6,265,851 B1 * 7/2001 Brien ...................... H02J 50/90 320/137
6,480,368 B1 11/2002 Lammers et al.
6,806,686 B1 10/2004 Thrap
7,035,070 B2 * 4/2006 Shiner ................. H02J 7/00308 361/91.1
7,180,277 B2 * 2/2007 Thrap ................ H03K 17/0822 323/282
7,342,768 B2 3/2008 Doljack et al.
7,345,454 B2 3/2008 Thrap
7,457,100 B2 11/2008 Nakajima et al.
7,482,816 B2 1/2009 Odajima et al.
7,531,987 B2 5/2009 Ohasi et al.
7,599,167 B2 10/2009 Doljack
7,599,168 B2 10/2009 Doljack et al.
7,647,191 B2 1/2010 Kakiuchi et al.
7,660,084 B2 2/2010 Kim et al.
7,812,572 B2 * 10/2010 Bolz ..................... H02J 7/0018 320/167
7,825,638 B2 * 11/2010 Bolz ..................... H02J 7/0016 320/167
7,880,449 B2 2/2011 Thrap
7,948,727 B2 * 5/2011 Shiner ................... H02J 7/0031 320/167
7,994,756 B2 * 8/2011 Rowland ............... H02J 7/0016 320/167
8,004,249 B2 * 8/2011 Lim ...................... H02J 7/0018 324/431
8,072,724 B2 * 12/2011 Shiner ................... H02J 7/0031 320/167
8,134,337 B2 3/2012 Morita
8,198,869 B2 * 6/2012 Yang ....................... H02M 3/07 320/155
8,198,870 B2 6/2012 Zuercher
8,269,469 B2 * 9/2012 Cegnar .................. H01G 11/16 320/167
8,305,035 B2 11/2012 Morita et al.
8,363,370 B2 * 1/2013 Shiner ................... H02J 7/0031 361/91.1
8,463,562 B2 6/2013 Nakanishi
8,587,263 B2 * 11/2013 Yang ....................... H02M 3/07 320/155
8,686,662 B1 4/2014 Bragg et al.
9,018,922 B2 4/2015 Morita et al.
9,190,860 B2 11/2015 Wright et al.
9,209,653 B2 12/2015 Maynard et al.
9,331,500 B2 * 5/2016 Knitt ..................... H02J 7/0016
9,431,855 B1 * 8/2016 Hetrick ................... H02J 9/065
9,601,931 B2 * 3/2017 Tabatabaei ............ H02J 7/0019
10,128,667 B2 * 11/2018 Werker ................. H02J 7/0016
10,374,440 B2 * 8/2019 Altemose .............. H02J 7/0019
10,418,825 B2 * 9/2019 Cheng ................... H02J 7/0019
10,449,869 B2 * 10/2019 Kleffel ................... H01G 11/08
10,454,293 B2 * 10/2019 Hansen ............. H02J 7/007194
10,523,019 B2 * 12/2019 Rohera ............... H01M 16/003
10,879,720 B2 12/2020 Hock
10,903,663 B2 1/2021 Hock
11,018,512 B2 * 5/2021 Zavodny ............... H02J 7/0019
11,592,497 B2 * 2/2023 Hock ................... G01R 31/371
11,802,916 B2 * 10/2023 Chung ................ H01M 10/441
12,334,767 B2 * 6/2025 Qureshi ................. H01G 11/10
2003/0076642 A1 * 4/2003 Shiner ................... H02J 7/0031 361/91.6
2003/0214267 A1 * 11/2003 Long ..................... H02J 7/0016 320/116
2004/0212346 A1 * 10/2004 Thrap ..................... H02J 7/345 320/119
2004/0263121 A1 * 12/2004 Thrap ...................... H02J 7/54 320/119
2005/0052169 A1 * 3/2005 Thrap ..................... H02J 7/345 323/282
2005/0180074 A1 * 8/2005 Doljack ................ H02J 7/0016 361/58
2005/0225305 A1 * 10/2005 Thrap ................ H03K 17/0822 323/234
2006/0152873 A1 * 7/2006 Shiner ................... H02J 7/0031 361/91.1
2006/0221516 A1 * 10/2006 Daboussi .............. H02J 7/0016 361/18
2006/0279257 A1 * 12/2006 Nakajima ........... H01L 27/0802 257/E27.047
2007/0001651 A1 * 1/2007 Harvey ................. H02J 7/0016 320/166
2007/0120549 A1 * 5/2007 Thrap ................ H03K 17/0822 323/364
2007/0139007 A1 * 6/2007 Lim ........................ B60L 50/40 320/116
2007/0210761 A1 * 9/2007 Ohasi .................... H02J 7/0019 320/166
2008/0001593 A1 * 1/2008 Odajima .............. G01R 31/396 324/123 R
2008/0007891 A1 * 1/2008 Doljack ................... H01G 4/40 361/502
2008/0013224 A1 * 1/2008 Kim .................... H02J 7/00308 320/134
2008/0174937 A1 * 7/2008 Doljack ................ H02J 7/0016 361/328
2008/0211456 A1 * 9/2008 Bolz ..................... H02J 7/0018 320/116
2008/0252266 A1 * 10/2008 Bolz ..................... H02J 7/0016 320/166
2008/0278221 A1 * 11/2008 Rowland ................ H02J 7/345 327/536
2009/0213512 A1 * 8/2009 Shiner ................. H02J 7/00308 361/91.1
2009/0228221 A1 * 9/2009 Kakiuchi ................ B60L 50/40 702/58
2009/0230926 A1 * 9/2009 Yang ....................... H02M 3/07 320/167
2009/0231764 A1 9/2009 Banting et al.
2009/0261782 A1 * 10/2009 Morita .................. H02J 7/0016 320/118
2009/0273321 A1 * 11/2009 Gotzenberger ......... H02J 7/345 320/166
2009/0322289 A1 * 12/2009 Zuercher ............... H02J 7/0016 320/167
2010/0004885 A1 * 1/2010 Nakanishi .......... G01R 31/3842 324/426
2010/0039072 A1 * 2/2010 Cegnar .................. H01G 11/10 320/167
2011/0075457 A1 * 3/2011 Thrap ................ H03K 17/0822 323/282
2011/0115427 A1 * 5/2011 Morita ...................... H02J 7/34 320/149
2011/0148362 A1 * 6/2011 Shiner ................. H02J 7/00308 320/137
2011/0204722 A1 * 8/2011 Kim ........................ H02J 7/345 307/77
2012/0039008 A1 * 2/2012 Shiner ................. H02J 7/00308 361/91.1
2012/0139492 A1 * 6/2012 Kleffel .................. H02J 7/0016 320/118
2012/0161722 A1 6/2012 Yang et al.
2012/0187774 A1 * 7/2012 Tabatabaei ............ H02J 7/0019 307/109
2013/0093400 A1 * 4/2013 Maynard ................ H02J 15/00 324/548

(56) References Cited

U.S. PATENT DOCUMENTS

2013/0119923 A1* 5/2013 Wright .................. H02J 7/0071 320/166
2013/0154579 A1* 6/2013 Morita ............. H02J 7/007194 320/166
2013/0278227 A1* 10/2013 Knitt ..................... H02J 7/0016 320/167
2014/0114592 A1 4/2014 Eilertsen
2016/0243960 A1 8/2016 Wood et al.
2016/0301221 A1 10/2016 Kaminsky
2017/0033569 A1 2/2017 Werker et al.
2017/0310128 A1* 10/2017 Cheng ....................... H02J 7/00
2017/0338669 A1* 11/2017 Hansen ............. H02J 7/007194
2018/0076644 A1* 3/2018 Qureshi ................ H01M 16/00
2018/0198290 A1* 7/2018 Rohera ................. H02J 7/0014
2018/0375345 A1 12/2018 Altemose
2019/0006124 A1* 1/2019 Hock ..................... H01G 11/18
2019/0006126 A1* 1/2019 Knopsnyder .......... H01G 11/10
2019/0006858 A1 1/2019 Hock
2019/0027942 A1* 1/2019 Hock .................. H02J 7/00712
2019/0074710 A1* 3/2019 Hansen .................. H01G 11/10
2019/0259549 A1* 8/2019 Hansen .................. H01G 11/10
2020/0185934 A1* 6/2020 Zavodny ............... H02J 7/0019
2020/0335992 A1* 10/2020 Qureshi ................ H02J 7/0013
2021/0249883 A1* 8/2021 Qureshi .............. H01M 10/425
2021/0333328 A1* 10/2021 Chung ................ H01M 10/482
2021/0373088 A1* 12/2021 Hock ..................... H01G 11/08
2021/0375557 A1* 12/2021 Hock ..................... H01G 11/16
2022/0130622 A1* 4/2022 Bartley .................. H01G 11/10
2022/0166229 A1* 5/2022 Bendle ................ H02J 7/00712
2022/0373606 A1* 11/2022 Fukuda ............... H01M 50/204
2023/0026454 A1* 1/2023 Cain ....................... G06F 1/188
2024/0103088 A1* 3/2024 Chung .................. H02J 7/0019
2025/0309669 A1* 10/2025 Qureshi ................. H01G 11/10

FOREIGN PATENT DOCUMENTS

| | | | | |
|---|---|---|---|---|
| CN | 109950951 A | | 6/2019 | |
| JP | 2000324711 A | | 11/2000 | |
| JP | 5304654 | | 10/2013 | |
| KR | 100733394 | | 6/2007 | |
| KR | 100998661 | | 12/2010 | |
| KR | 101748355 | | 6/2017 | |
| WO | WO2009118119 | | 10/2009 | |
| WO | WO2009118120 | | 10/2009 | |
| WO | WO-2013056531 A1 | * | 4/2013 | H02J 7/0014 |

OTHER PUBLICATIONS

Yu Yanqi et al: “A Series Resonant Energy Storage Cell Voltage Balancing Circuit”, IEEE Journal of Emerging and Selected Topics in Power Electronics, IEEE, Piscataway, NJ, USA, vol. 8, No. 3, May 6, 2019, pp. 3151-3161.

Supplementary European Search Report for corresponding European Patent Application No. 21833554.5, dated Jun. 25, 2024, 10 pages.

* cited by examiner

SYSTEM AND METHOD FOR BALANCING ULTRACAPACITORS EMPLOYING A SWITCHED CHARGE SHUTTLING CAPACITOR

PRIORITY CLAIM

This application claims the benefit of priority of U.S. Provisional Patent Application Ser. No. 63/045,887, filed on Jun. 30, 2020, titled "System and Method for Balancing Ultracapacitors," which is incorporated herein by reference.

BACKGROUND

Electrical energy storage cells are widely used to provide power to electronic, electromechanical, electrochemical, and other useful devices. A double layer ultracapacitor, for instance, can employ a pair of polarizable electrodes that contain carbon particles (e.g., activated carbon) impregnated with a liquid electrolyte. Due to the effective surface area of the particles and the small spacing between the electrodes, large capacitance values can be achieved. The individual double layer capacitors may be combined together to form a module having a raised output voltage or increased energy capacity.

SUMMARY

One aspect of the present disclosure is directed to a system for balancing ultracapacitors. The system includes a balancing capacitor and a plurality of switching devices. The system further includes a control circuit. The control circuit is communicatively coupled to each of the plurality of switching devices. The control circuit is configured to control operation of a first pair of the switching devices to couple the balancing capacitor across a first ultracapacitor of a plurality of ultracapacitors to transfer electrical charge from the first ultracapacitor to the balancing capacitor. The control circuit is further configured to control operation of a second pair of the switching devices that is different than the first pair to couple the balancing capacitor across a second ultracapacitor of the plurality of ultracapacitors to transfer at least a portion of the electrical charge from the balancing capacitor to the second ultracapacitor.

Another aspect of the present disclosure is directed to a method for balancing ultracapacitors. The method includes controlling operation of a first pair of switching devices to couple a balancing capacitor across a first ultracapacitor of a plurality of ultracapacitors. When the balancing capacitor is coupled across the first ultracapacitor via the first pair of switching devices, the method includes discharging the first ultracapacitor to transfer electrical charge from the first ultracapacitor to the balancing capacitor. Subsequent to discharging the first ultracapacitor to transfer the electrical charge to the balancing capacitor, the method includes controlling operation of a second pair of switching devices that is different than the first pair of switching devices to couple the balancing capacitor across a second ultracapacitor of the plurality of ultracapacitors. When the balancing capacitor is coupled across the second ultracapacitor via the second pair of switching devices, the method includes discharging the balancing capacitor to transfer at least a portion of the electrical charge to the second ultracapacitor.

Other features and aspects of the present disclosure are set forth in greater detail below.

BRIEF DESCRIPTION OF THE DRAWINGS

A full and enabling disclosure of the present disclosure, including the best mode thereof, directed to one of ordinary skill in the art, is set forth more particularly in the remainder of the specification, which makes reference to the appended figure in which.

Figure 1:
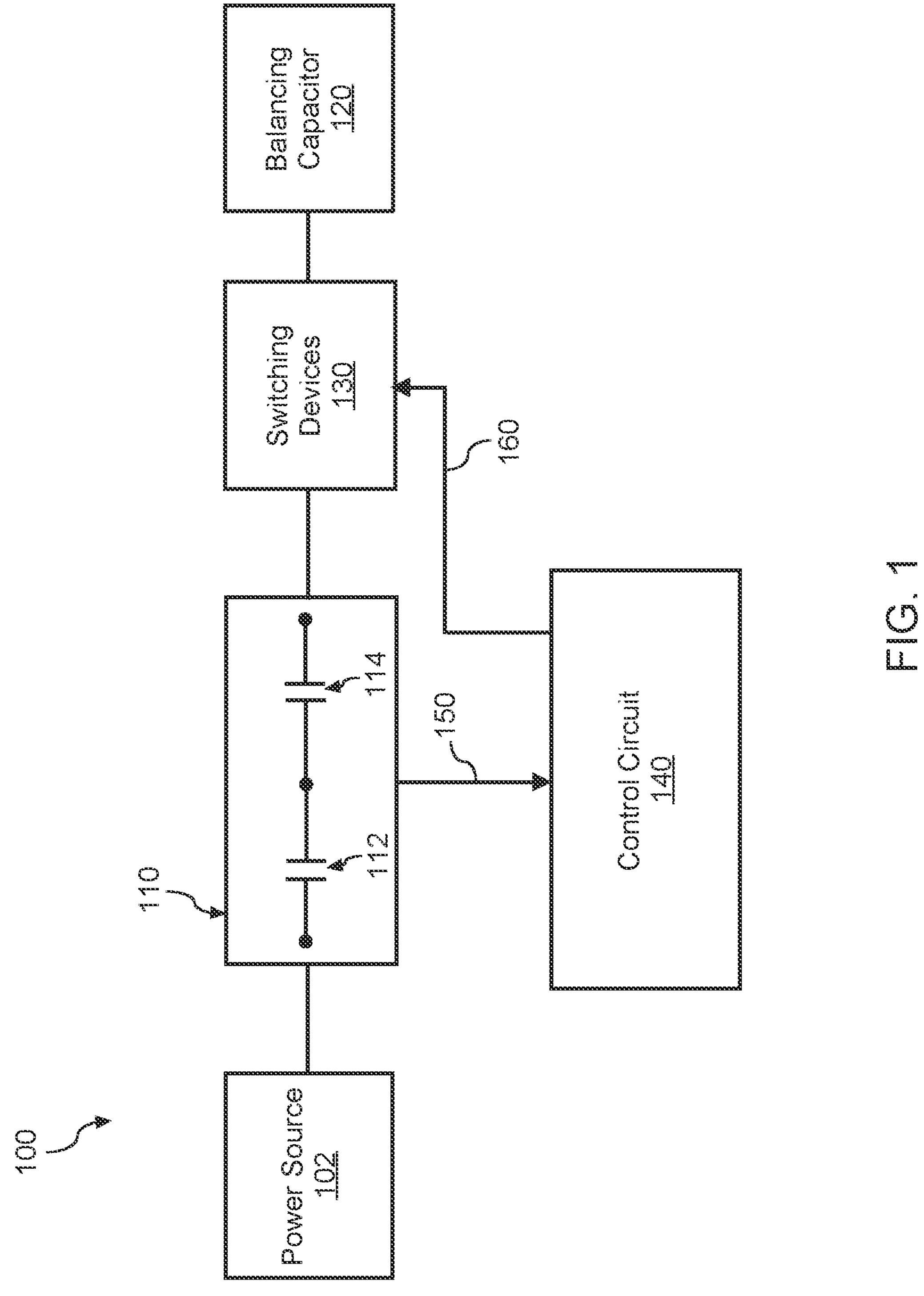
FIG. 1 depicts a block diagram of components of a system for balancing ultracapacitors according to example embodiments of the present disclosure.

Repeat use of reference characters in the present specification and drawing is intended to represent same or analogous features or elements of the disclosure.

DETAILED DESCRIPTION OF REPRESENTATIVE EMBODIMENTS

It is to be understood by one of ordinary skill in the art that the present discussion is a description of exemplary embodiments only and is not intended as limiting the broader aspects of the present disclosure, which broader aspects are embodied in the exemplary construction.

Example aspects of the present disclosure are directed to a system for balancing ultracapacitors. The system can include a balancing capacitor and a plurality of switching devices. The balancing capacitor can be selectively coupled across each of a plurality of ultracapacitors via different pairs (e.g., first pair, second pair, etc.) of the switching devices. For instance, the balancing capacitor can be coupled across a first ultracapacitor of the plurality of ultracapacitors via a first pair of the switching devices. Alternatively, the balancing capacitor can be coupled across a second ultracapacitor of the plurality of ultracapacitors via a second pair of the switching devices that is different than the first pair.

In some implementations, the balancing capacitor can be a supercapacitor that is separate from the plurality of ultracapacitors. More specifically, the plurality of ultracapacitors can be coupled to one another in series, and the balancing capacitor can be a supercapacitor that is selectively coupled in parallel to each of the plurality of ultracapacitors. Alternatively, or additionally, a capacitance of the balancing capacitor can be smaller than a capacitance of at least one of the plurality of ultracapacitors. In alternative implementations, the capacitance of the balancing capacitor can be the same as the capacitance of at least one of the plurality of ultracapacitors. For instance, in some implementations, a capacitance of the balancing capacitor and a capacitance of each of the plurality of ultracapacitors can be the same.

The system can include a control circuit. The control circuit can be configured to obtain data indicative of a voltage across each of the plurality of ultracapacitors. For instance, in some implementations, the control circuit can obtain a plurality of signals. In such implementations, each of the plurality of signals can be indicative of a voltage across a corresponding ultracapacitor. For instance, a first signal of the plurality of signals can be indicative of a first voltage across the first ultracapacitor. Additionally, a second signal of the plurality of signals can be indicative of a second voltage across the second ultracapacitor. In some implementations, the control circuit can determine the first voltage across the first ultracapacitor and the second voltage across the second ultracapacitor correspond to a highest voltage amongst the plurality of ultracapacitors and a lowest voltage amongst the plurality of ultracapacitors, respectively. Furthermore, in such implementations, the control circuit can be configured to determine the first voltage (e.g., highest voltage) across the first ultracapacitor and the second voltage (e.g., lowest voltage) across the second ultracapacitor are not substantially the same (e.g., not within 10% of one another).

The control circuit can be configured to control operation of the plurality of switching devices in response to determining the voltage across the first ultracapacitor is different than the voltage across the second ultracapacitor. For instance, the control circuit can be configured to provide one or more control signals to each switching device (e.g., first switching device and second switching device) in the first pair of switching devices in response to determining the first voltage across the first ultracapacitor is different than the second voltage across the second ultracapacitor. More specifically, the one or more control signals can be associated with coupling the balancing capacitor across the first ultracapacitor.

When the balancing capacitor is coupled across the first ultracapacitor via the first pair of switching devices, the first ultracapacitor can provide a discharge current to the balancing capacitor. The discharge current can be associated with transferring electrical charge from the first ultracapacitor to the balancing capacitor. In this manner, the first ultracapacitor can charge the balancing capacitor when the balancing capacitor is coupled across the first ultracapacitor via the first pair of switching devices.

In some implementations, an amount of electrical charge transferred from the first ultracapacitor to the balancing capacitor can correspond to an amount of electrical charge needed to make the first voltage across the first ultracapacitor and the second voltage across the second ultracapacitor be substantially the same. As used herein, the term "substantially the same" refers to the first voltage and the second voltage being within 10% of one another. In such implementations, the control circuit can be configured to control operation of the first pair of switching devices to decouple the balancing capacitor from the first ultracapacitor when the amount of electrical charge transferred from the first ultracapacitor to the balancing capacitor corresponds to the amount of electrical charge needed to make the first voltage across the first ultracapacitor and the second voltage across the second ultracapacitor be substantially the same. The one or more control signals can be associated with decoupling the balancing capacitor from the first ultracapacitor.

After the balancing capacitor has been charged via the first ultracapacitor, the control circuit can be configured to provide one or more control signals associated with coupling the balancing capacitor across the second ultracapacitor via the second pair of switching devices. For instance, the control circuit can provide one or more control signals to each switching device (e.g., third switching device and fourth switching device) in the second pair of switching devices. The one or more control signals can be associated with coupling the balancing capacitor across the second ultracapacitor.

When the balancing capacitor is coupled across the second ultracapacitor via the second pair of switching devices, the balancing capacitor can provide a discharge current to the second ultracapacitor. The discharge current can be associated with transferring at least a portion of the electrical charge from the balancing capacitor to the second ultracapacitor. In this manner, the balancing capacitor can charge the second ultracapacitor when the balancing capacitor is coupled to the second ultracapacitor via the second pair of switching devices.

In some implementations, the amount of electrical charge transferred from the balancing capacitor to the second ultracapacitor can correspond to an amount of electrical charge needed to increase the second voltage across the second ultracapacitor such that the first voltage across the first ultracapacitor and the second voltage across the second ultracapacitor are substantially the same. In such implementations, the control circuit can be configured to control operation of the second pair of switching devices to decouple the balancing capacitor from the second ultracapacitor when the amount of electrical charge transferred from the balancing capacitor to the second ultracapacitor corresponds to the amount needed to make the first voltage and the second voltage be substantially the same. For instance, the control circuit can provide one or more control signals to each switching device in the second pair of switching devices. The one or more control signals can be associated with decoupling the balancing capacitor from the second ultracapacitor.

The system according to example aspects of the present disclosure provides numerous technical effects and benefits. For instance, the balancing capacitor can transfer electrical charge (e.g., electrical energy) from the first ultracapacitor to the second ultracapacitor as needed to balance the plurality of ultracapacitors. Furthermore, heat associated with balancing the ultracapacitors can be reduced, because the balancing capacitor generates less heat compared to discharge resistors used in conventional balancing systems for ultracapacitors.

Referring now to the FIGS., FIG. 1 depicts a system 100 for balancing a plurality of ultracapacitors 110 according to example embodiments of the present disclosure. The plurality of ultracapacitors 110 can be coupled to a power supply 102 (e.g., direct current). In this manner, each of the plurality of ultracapacitors 110 can receive electrical power (e.g., direct current power) from the power supply 102. Furthermore, as shown, the plurality of ultracapacitors 110 can include at least a first ultracapacitor 112 and a second ultracapacitor 114. In alternative implementations, the plurality of ultracapacitors 110 can include more than two ultracapacitors. For instance, in some implementations, the plurality of ultracapacitors 110 can include three or more ultracapacitors.

The system 100 can include a balancing capacitor 120. In some implementations, the balancing capacitor 120 can be a supercapacitor that is separate from the plurality of ultracapacitors 110. More specifically, the plurality of ultracapacitors 110 can be coupled to one another in series, whereas the balancing capacitor 120 can be a supercapacitor that is selectively coupled in parallel to each of the plurality of ultracapacitors 110. Alternatively, or additionally, a capacitance of the balancing capacitor 120 can be smaller than a capacitance of at least one of the plurality of ultracapacitors 110. In alternative implementations, the capacitance of the balancing capacitor 120 can be the same as the capacitance at least one of the plurality of ultracapacitors 110. For instance, in some implementations, a capacitance of the balancing capacitor and a capacitance of each of the plurality of ultracapacitors can be the same.

The system 100 can include a plurality of switching devices 130. The balancing capacitor 120 can be selectively coupled across each of the plurality of ultracapacitors 110 via different pairs (e.g., first pair, second pair, etc.) of the switching devices 130. For instance, the balancing capacitor 120 can be selectively coupled across the first ultracapacitor 112 via a first pair (e.g., first switching device and second switching device) of the switching devices 130. Alternatively, the balancing capacitor 120 can be selectively coupled across the second ultracapacitor 114 via a second pair (e.g., third switching device and fourth switching device) of the switching devices 130 that is different than the first pair.

It should be understood that the switching devices 130 can include any device configured to electrically couple the balancing capacitor 120 to the ultracapacitors 110. For instance, in some implementations, one or more of the switching devices 130 can be a transistor. Examples of the transistor can include, without limitation, bipolar junction transistors (BJTs) and field effect transistors (FETs). Alternatively, or additionally, one or more of the switching devices 130 can be a mechanical switch (e.g., relay, single pole, single throw). It should also be understood that a combined total number of switching devices included in the plurality of switching devices 130 is greater than a combined total number of ultracapacitors included in the plurality of ultracapacitors 110. More specifically, the combined total number of switching devices in the plurality of switching devices 130 can be double the combined total number of ultracapacitors included in the plurality of ultracapacitors 110.

As shown, the system 100 can include a control circuit 140. In some implementations, the control circuit 140 can include a processing circuit (not shown). As used herein, the term "processor" or "processing circuit" refers not only to integrated circuits referred to in the art as being included in a computer, but also refers to a controller, microcontroller, a microcomputer, a programmable logic controller (PLC), an application specific integrated circuit (ASIC), a Field Programmable Gate Array (FPGA), and other programmable circuits.

The control circuit 140 can be configured to obtain data indicative of a voltage across each of the plurality of ultracapacitors 110. For instance, in some implementations, the control circuit 140 can obtain a plurality of signals 150. In such implementations, each of the plurality of a signals can be indicative of a voltage across a corresponding ultracapacitor of the plurality of ultracapacitors 110. For instance, a first signal of the plurality of signals 150 can be indicative of a voltage across the first ultracapacitor 112 of the plurality of ultracapacitors 110. Additionally, a second signal of the plurality of signals 150 can be indicative of a voltage across the second ultracapacitor 114 of the plurality of ultracapacitors 110.

The control circuit 140 can be configured to determine whether the ultracapacitors 110 are balanced based, at least in part, on the plurality of signals 150. More specifically, the control circuit 140 can be configured to determine whether a voltage across each of the plurality of ultracapacitors 110 is substantially the same. As will be discussed below, when the control circuit 140 determines the plurality of ultracapacitors 110 are unbalanced (that is, the voltage across each ultracapacitor is not substantially the same), the control circuit 140 can provide one or more control signals 160 associated with controlling operation of the switching devices 130 to facilitate the transfer of electrical charge from one ultracapacitor (e.g., first ultracapacitor 112) to another ultracapacitor (e.g., second ultracapacitor 114) via the balancing capacitor 120. In this manner, the electrical energy can be transferred as needed to rebalance the ultracapacitors 110.

Figure 2:
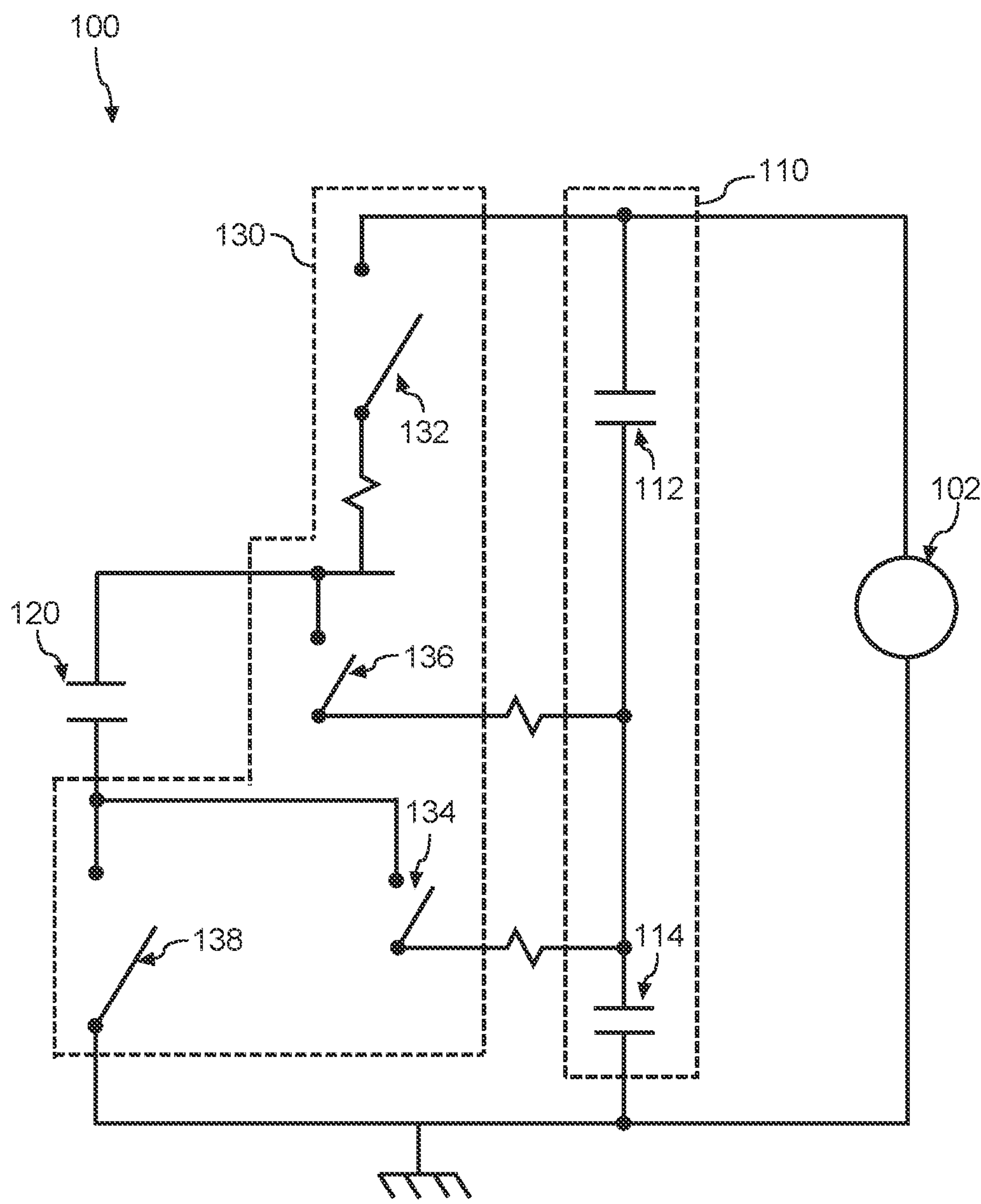
FIG. 2 depicts a balancing capacitor of a system for balancing ultracapacitors decoupled from each of the ultracapacitors according to example embodiments of the present disclosure.
Figure 3:
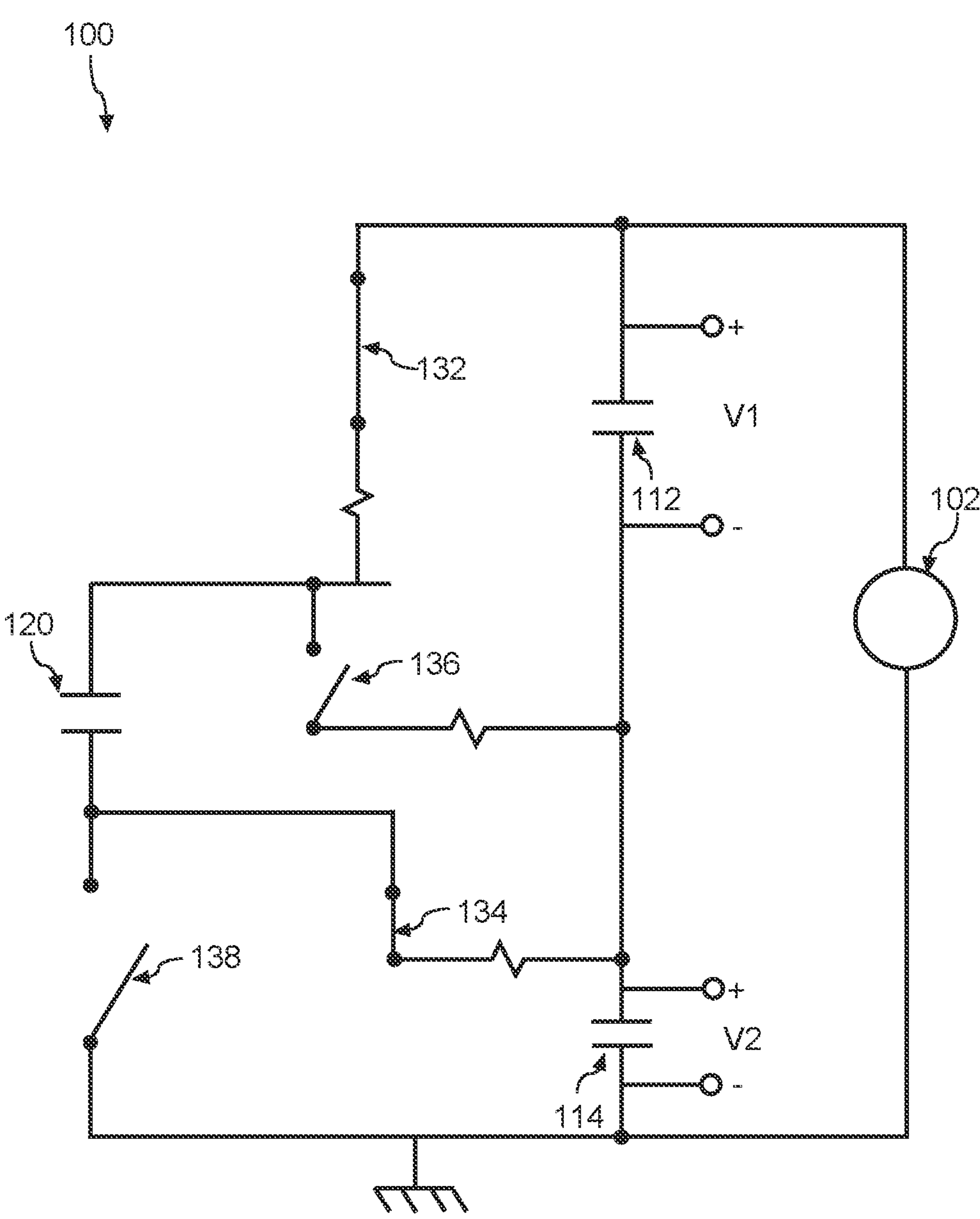
FIG. 3 depicts a balancing capacitor of a system for balancing ultracapacitors coupled across a first ultracapacitor via a first pair of switching devices of the system according to example embodiments of the present disclosure.
Figure 4:
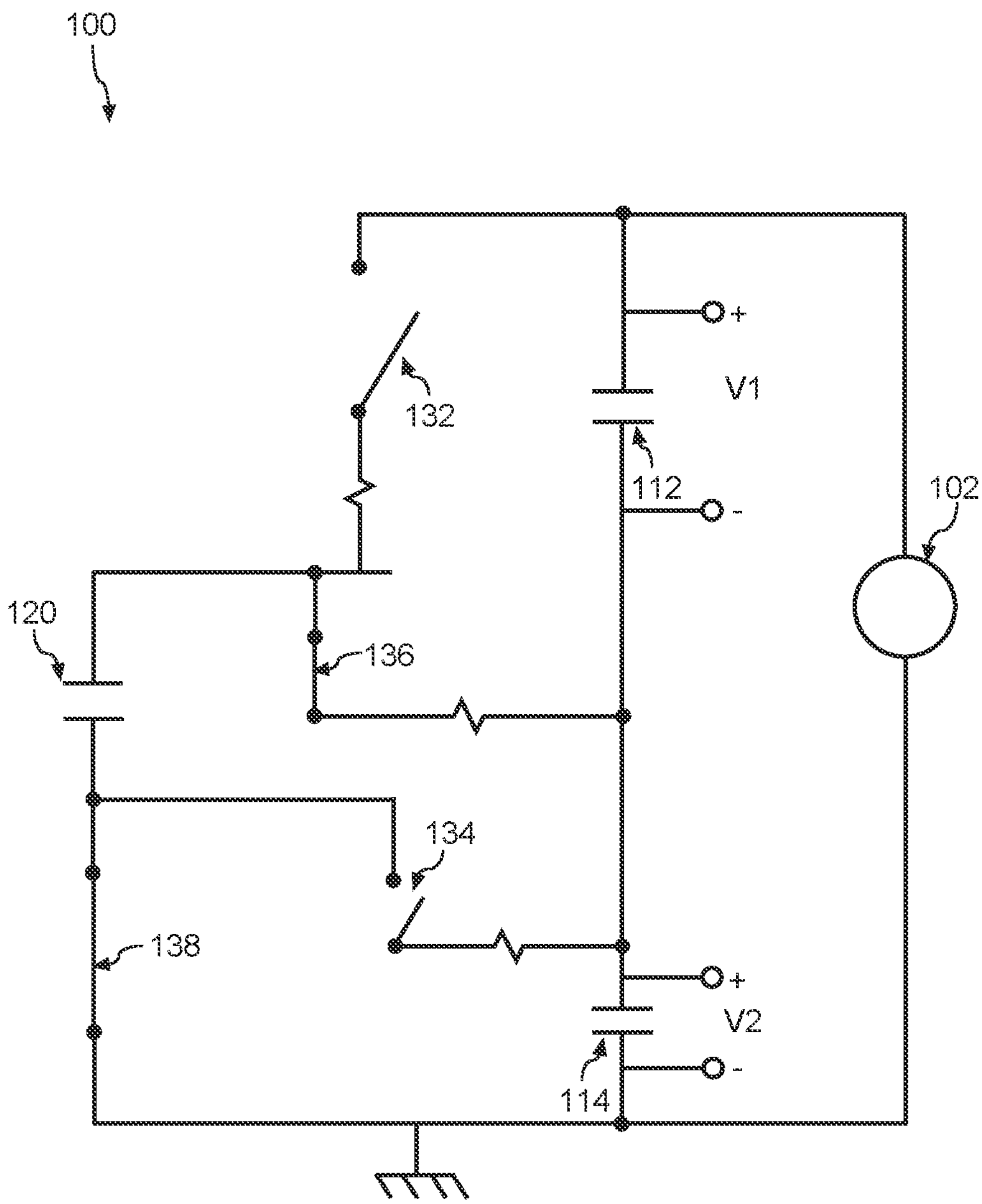
FIG. 4 depicts a balancing capacitor of a system for balancing ultracapacitors coupled across a second ultracapacitor via a second pair of switching devices of the system according to example embodiments of the present disclosure

Referring now to FIGS. 2-4, an embodiment of the system 100 is provided according to example embodiments of the present disclosure. As shown, the plurality of switching devices 130 can include a first pair of switching devices and a second pair of switching devices. The first pair of switching devices can include a first switching device 132 and a second switching device 134. The second pair of switching devices can include a third switching device 136 and a fourth switching device 138. The balancing capacitor 120 can be selectively coupled across the first ultracapacitor 112 and the second ultracapacitor 114 via the first pair of switching devices (e.g., first switching device 132 and second switching device 134) and the second pair of switching devices (e.g., third switching device 136 and fourth switching device 138), respectively.

When the control circuit 140 (shown in FIG. 1) determines a first voltage V1 across the first ultracapacitor 112 is different than (e.g., not substantially the same as) a second voltage V2 across the second ultracapacitor 114, the control circuit 140 can be configured to control operation of the first pair of switching devices. For instance, in some implementations, the control circuit 140 can determine the first voltage V1 across the first ultracapacitor 112 and the second voltage V2 across the second ultracapacitor 114 correspond to a highest voltage amongst the plurality of ultracapacitors 110 and a lowest voltage amongst the plurality or ultracapacitors 110, respectively. Furthermore, in such implementations, the control circuit 140 can be configured to determine the first voltage V1 (e.g., highest voltage) across the first ultracapacitor 112 and the second voltage V1 (e.g., lowest voltage) across the second ultracapacitor 114 are not substantially the same (e.g., not within 10% of one another).

The control circuit 140 can be configured to provide one or more control signals 160 (shown in FIG. 1) to each switching device (e.g., first switching device 132 and second switching device 134) in the first pair of switching devices in response to determining the first voltage V1 across the first ultracapacitor 112 is different than (e.g., not substantially the same as) the second voltage V2 across the second ultracapacitor 114. More specifically, the one or more control signals 160 (shown in FIG. 1) can be associated with coupling the balancing capacitor 120 across the first ultracapacitor 112.

When the balancing capacitor 120 is coupled across the first ultracapacitor 112 via the first pair of switching devices (e.g., first switching device 132 and second switching device 134) as shown in FIG. 3, the first ultracapacitor 112 can provide a discharge current to the balancing capacitor 120. The discharge current can be associated with transferring electrical charge from the first ultracapacitor 112 to the balancing capacitor 120. In this manner, the first ultracapacitor 112 can charge the balancing capacitor 120 when the balancing capacitor 120 is coupled across the first ultracapacitor 112 via the first pair of switching devices.

In some implementations, an amount of electrical charge transferred from the first ultracapacitor 112 to the balancing capacitor 120 can correspond to an amount needed to make the first voltage V1 across the first ultracapacitor 112 and the second voltage V2 across the second ultracapacitor 114 be substantially the same. In such implementations, the control circuit 140 (shown in FIG. 1) can be configured to control operation of the first pair of switching devices (e.g., first switching device 132 and second switching device 134) to decouple the balancing capacitor 120 from the first ultracapacitor 112 when the amount of electrical charge transferred from the first ultracapacitor 112 to the balancing capacitor 120 corresponds to the amount of electrical charge needed to make the first voltage V1 across the first ultracapacitor 112 and the second voltage V2 across the second ultracapacitor 114 be substantially the same. The one or more control signals 160 (shown in FIG. 1) can be associated with decoupling the balancing capacitor 120 from the first ultracapacitor 112.

After the balancing capacitor 120 has been charged via the first ultracapacitor 112, the control circuit 140 (shown in FIG. 1) can be configured to provide one or more control signals 160 (also shown in FIG. 1) associated with coupling the balancing capacitor 120 across the second ultracapacitor 114 via the second pair of switching devices (e.g., third switching device 136 and fourth switching device 138). For instance, the control circuit 140 can provide one or more control signals 160 (shown in FIG. 1) to each switching device (e.g., third switching device 136 and fourth switching device 138) in the second pair of switching devices. The one or more control signals 160 can be associated with coupling the balancing capacitor 120 across the second ultracapacitor 114.

When the balancing capacitor 120 is coupled across the second ultracapacitor 114 via the second pair of switching devices (e.g., third switching device 136 and fourth switching device 138), the balancing capacitor 120 can provide a discharge current to the second ultracapacitor 114. The discharge current can be associated with transferring at least a portion of the electrical charge from the balancing capacitor 120 to the second ultracapacitor 114. In this manner, the balancing capacitor 120 can charge the second ultracapacitor 114 when the balancing capacitor 120 is coupled to the second ultracapacitor 114 via the second pair of switching devices (e.g., third switching device 136 and fourth switching device 138).

In some implementations, an amount of electrical charge transferred from the balancing capacitor 120 to the second ultracapacitor 114 can correspond to an amount of electrical charge needed to make the first voltage V1 across the first ultracapacitor 112 and the second voltage V2 across the second ultracapacitor 114 be substantially the same. In such implementations, the control circuit 140 (shown in FIG. 1) can be configured to control operation of the second pair of switching devices (e.g., third switching device 136 and fourth switching device 138) to decouple the balancing capacitor 120 from the second ultracapacitor 114 when the amount of electrical charge transferred from the balancing capacitor 120 to the second ultracapacitor 114 corresponds to the amount needed to make the first voltage V1 across the first ultracapacitor 112 and the second voltage V2 across the second ultracapacitor 114 be substantially the same. For instance, the control circuit 140 can provide one or more control signals 160 (shown in FIG. 1) to each switching device in the second pair of switching devices. The one or more control signals 160 can be associated with decoupling the balancing capacitor from the second ultracapacitor.

Figure 5:
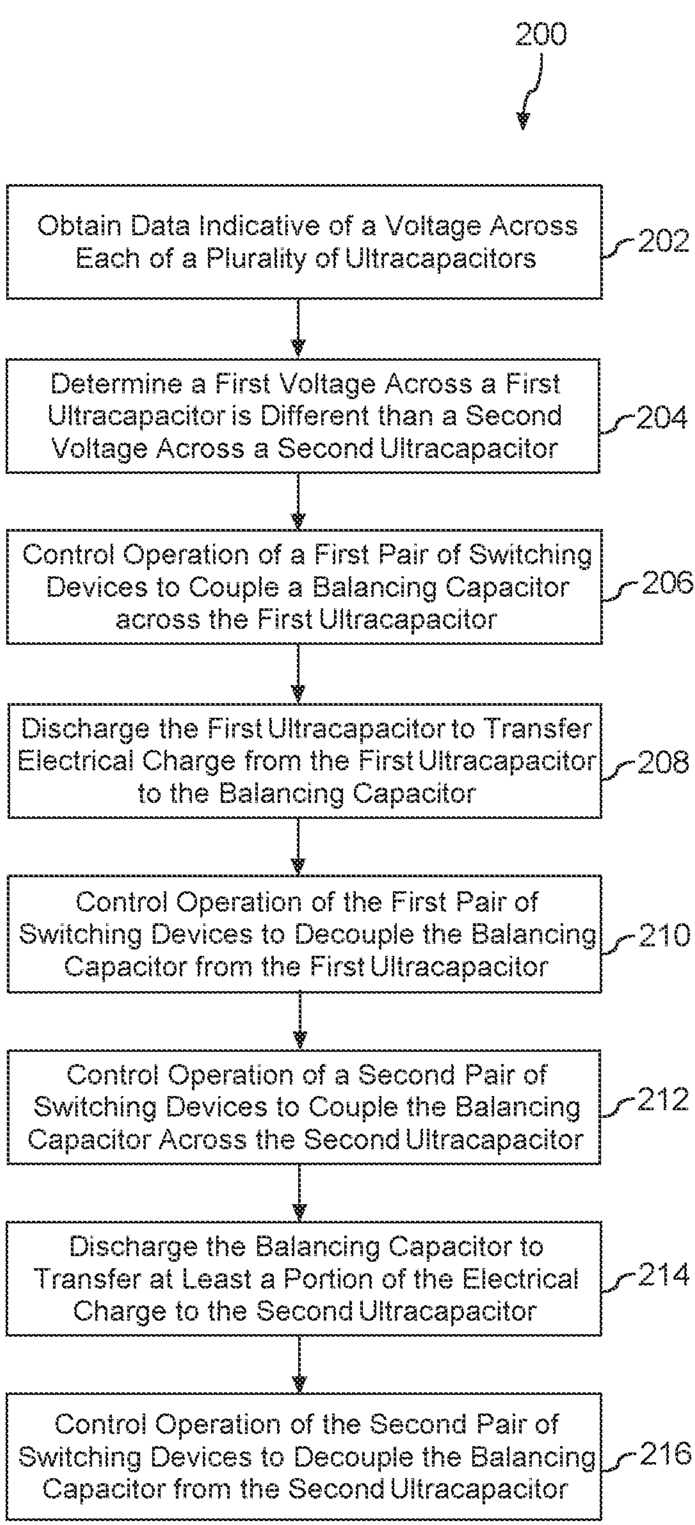
FIG. 5 depicts a flow diagram of an example method for balancing ultracapacitors according to example embodiments of the present disclosure.

Referring now to FIG. 5, a method 200 for balancing ultracapacitors is provided according to example embodiments of the present disclosure. The method 200 can be implemented, for instance, using the system 100 depicted in FIGS. 1 through 4. FIG. 5 depicts steps performed in a particular order for purposes of illustration and discussion. Those of ordinary skill in the art, using the disclosures provided herein, will understand that various steps of any of the methods disclosed herein can be omitted, rearranged, performed simultaneously, expanded, modified, and/or adapted in various ways without deviating from the scope of the present disclosure.

At (202), the method 200 can include obtaining data indicative of a voltage across each of the plurality of ultracapacitors. For instance, in some implementations, obtaining data indicative of a voltage across each of the plurality of ultracapacitors can include obtaining, via a control circuit, a plurality of signals. Each of the plurality of signals can be indicative of a voltage across a corresponding ultracapacitor of the plurality of ultracapacitors.

At (204), the method 200 can include determining a first voltage across a first ultracapacitor of the plurality of ultracapacitor is different from a second voltage across a second ultracapacitor of the plurality of ultracapacitors based, at least in part, on the data obtained at (202). For instance, in some implementations, determining the first voltage is different than the second voltage can include determining, via a control circuit, the first voltage and the second voltage correspond to a highest voltage amongst the plurality of ultracapacitors and a lowest voltage amongst the plurality of ultracapacitors, respectively. More specifically, in such implementations, the control circuit can be configured to determine the highest voltage and the second voltage are not substantially the same (e.g., not within 10% of one another).

At (206), the method 200 can include controlling operation of a first pair of switching devices to couple a balancing capacitor across a first ultracapacitor of a plurality of ultracapacitors. For instance, controlling operation of the first pair of switching devices can include providing, via the control circuit, one or more control signals to each switching device in the first pair of switching devices. The one or more control signals can be associated with controlling operation of each of the switching devices in the first pair of switching devices to couple the balancing capacitor to the first ultracapacitor.

At (208), the method 200 can include discharging the first ultracapacitor to transfer electrical charge from the first ultracapacitor to the balancing capacitor when the balancing capacitor is coupled across the first ultracapacitor via the first pair of switching devices. In some implementations, an amount of electrical charge transferred from the first ultracapacitor to the balancing capacitor can correspond to an amount needed to make the first voltage across the first ultracapacitor and the second voltage across the second ultracapacitor be substantially the same.

At (210), the method 200 can include controlling operation of the first pair of switching devices to decouple the balancing capacitor from the first ultracapacitor in response to discharging the first ultracapacitor to transfer electrical charge to the balancing capacitor at (208). For instance, in some implementations, the control circuit can provide one or more control signals to each switching device (e.g., first switching device and second switching device) in the first pair of switching devices. The one or more control signals can be associated with controlling operation of the first pair of switches to decouple the balancing capacitor from the first ultracapacitor.

At (212), the method 200 can include controlling operation of the second pair of switching devices to couple the balancing capacitor across the second ultracapacitor. For instance, in some implementations, the control circuit can provide one or more control signals to each switching device (e.g., third switching device and fourth switching device) in the second pair of switching devices. The one or more control signals can be associated with controlling operation of the second pair of switches to couple the balancing capacitor across the second ultracapacitor.

At (214), the method 200 can include discharging the balancing capacitor to transfer at least a portion of the electrical charge to the second ultracapacitor when the balancing capacitor is coupled across the second ultracapacitor via the second pair of switching devices while the balancing capacitor is coupled across the second ultracapacitor via the second pair of switches. In some implementations, the amount of electrical charge transferred from the balancing capacitor to the second ultracapacitor can correspond to an amount needed to make the first voltage across the first ultracapacitor and the second voltage across the second ultracapacitor be substantially the same.

At (216), the method 200 can include controlling operation of the second pair of switching devices to decouple the balancing capacitor from the second ultracapacitor. For instance, in some implementations, the control circuit can provide one or more control signals to each switching device (e.g., third switching device and fourth switching device) in the second pair of switching devices. The one or more control signals can be associated with controlling operation of the second pair of switches to decouple the balancing capacitor from the second ultracapacitor.

Any of a variety of different individual ultracapacitors may generally be employed in the module according to example aspects of the present disclosure. In some embodiments, however, the ultracapacitor contains an electrode assembly and electrolyte contained and optionally hermetically sealed within a housing. The electrode assembly may, for instance, contain a first electrode that contains a first carbonaceous coating (e.g., activated carbon particles) electrically coupled to a first current collector, and a second electrode that contains a second carbonaceous coating (e.g., activated carbon particles) electrically coupled to a second current collector. It should be understood that additional current collectors may also be employed if desired, particularly if the ultracapacitor includes multiple energy storage cells. The current collectors may be formed from the same or different materials. Regardless, each collector is typically formed from a substrate that includes a conductive metal, such as aluminum, stainless steel, nickel, silver, palladium, etc., as well as alloys thereof. Aluminum and aluminum alloys are particularly suitable for use in the present disclosure. The substrate may be in the form of a foil, sheet, plate, mesh, etc. The substrate may also have a relatively small thickness, such as about 200 micrometers or less, in some embodiments from about 1 to about 100 micrometers, in some embodiments from about 5 to about 80 micrometers, and in some embodiments, from about 10 to about 50 micrometers. Although by no means required, the surface of the substrate may be optionally roughened, such as by washing, etching, blasting, etc.

In some embodiments, at least one of the first and second current collectors, and preferably both, may also contain a plurality of fiber-like whiskers that project outwardly from the substrate. Without intending to be limited by theory, it is believed that these whiskers can effectively increase the surface area of the current collector and also improve the adhesion of the current collector to the corresponding electrode. This can allow for the use of a relatively low binder content in the first electrode and/or second electrode, which can improve charge transfer and reduce interfacial resistance and consequently result in very low ESR values. The whiskers are typically formed from a material that contains carbon and/or a reaction product of carbon and the conductive metal. In one embodiment, for example, the material may contain a carbide of the conductive metal, such as aluminum carbide ($Al_4C_3$). In general, the plurality of whiskers project outwardly from a substrate. If desired, the whiskers may optionally project from a seed portion that is embedded within the substrate. Similar to the whiskers, the seed portion may also be formed from a material that contains carbon and/or a reaction product of carbon and the conductive metal, such as a carbide of the conductive metal (e.g., aluminum carbide).

The manner in which such whiskers are formed on the substrate may vary as desired. In one embodiment, for instance, the conductive metal of the substrate is reacted with a hydrocarbon compound. Examples of such hydrocarbon compounds may include, for instance, paraffin hydrocarbon compounds, such as methane, ethane, propane, n-butane, isobutane, pentane, etc.; olefin hydrocarbon compounds, such as ethylene, propylene, butene, butadiene, etc.; acetylene hydrocarbon compounds, such as acetylene; as well as derivatives or combinations of any of the foregoing. It is generally desired that the hydrocarbon compounds are in a gaseous form during the reaction. Thus, it may be desired to employ hydrocarbon compounds, such as methane, ethane, and propane, which are in a gaseous form when heated. Although not necessarily required, the hydrocarbon compounds are typically employed in a range of from about 0.1 parts to about 50 parts by weight, and in some embodiments, from about 0.5 parts by weight to about 30 parts by weight, based on 100 parts by weight of the substrate. To initiate the reaction with the hydrocarbon and conductive metal, the substrate is generally heated in an atmosphere that is at a temperature of about 300° C. or more, in some embodiments about 400° C. or more, and in some embodiments, from about 500° C. to about 650° C. The time of heating depends on the exact temperature selected, but typically ranges from about 1 hour to about 100 hours. The atmosphere typically contains a relatively low amount of oxygen to minimize the formation of a dielectric film on the surface of the substrate. For example, the oxygen content of the atmosphere may be about 1% by volume or less.

First and second carbonaceous coatings are also electrically coupled to the first and second current collectors, respectively. While they may be formed from the same or different types of materials and may contain one or multiple layers, each of the carbonaceous coatings generally contains at least one layer that includes activated particles. In certain embodiments, for instance, the activated carbon layer may be directly positioned over the current collector and may optionally be the only layer of the carbonaceous coating. Examples of suitable activated carbon particles may include, for instance, coconut shell-based activated carbon, petroleum coke-based activated carbon, pitch-based activated carbon, polyvinylidene chloride-based activated carbon, phenolic resin-based activated carbon, polyacrylonitrile-based activated carbon, and activated carbon from natural sources such as coal, charcoal or other natural organic sources.

In certain embodiments, it may be desired to selectively control certain aspects of the activated carbon particles, such as their particle size distribution, surface area, and pore size distribution to help improve ion mobility for certain types of electrolytes after being subjected to one or more charge-discharge cycles. For example, at least 50% by volume of the particles (D50 size) may have a size in the range of from about 0.01 to about 30 micrometers, in some embodiments from about 0.1 to about 20 micrometers, and in some embodiments, from about 0.5 to about 10 micrometers. At least 90% by volume of the particles (D90 size) may likewise have a size in the range of from about 2 to about 40 micrometers, in some embodiments from about 5 to about 30 micrometers, and in some embodiments, from about 6 to about 15 micrometers. The BET surface may also range from about 900 $m^2/g$ to about 3,000 $m^2/g$, in some embodiments from about 1,000 $m^2/g$ to about 2,500 $m^2/g$, and in some embodiments, from about 1,100 $m^2/g$ to about 1,800 $m^2/g$.

In addition to having a certain size and surface area, the activated carbon particles may also contain pores having a certain size distribution. For example, the amount of pores less than about 2 nanometers in size (i.e., "micropores") may provide a pore volume of about 50 vol. % or less, in some embodiments about 30 vol. % or less, and in some embodiments, from 0.1 vol. % to 15 vol. % of the total pore volume. The amount of pores between about 2 nanometers and about 50 nanometers in size (i.e., "mesopores") may likewise be from about 20 vol. % to about 80 vol. %, in some embodiments from about 25 vol. % to about 75 vol. %, and in some embodiments, from about 35 vol. % to about 65 vol. %. Finally, the amount of pores greater than about 50 nanometers in size (i.e., "macropores") may be from about 1 vol. % to about 50 vol. %, in some embodiments from about 5 vol. % to about 40 vol. %, and in some embodiments, from about 10 vol. % to about 35 vol. %. The total pore volume of the carbon particles may be in the range of from about 0.2 $cm^3/g$ to about 1.5 $cm^3/g$, and in some embodiments, from about 0.4 $cm^3/g$ to about 1.0 $cm^3/g$, and the median pore width may be about 8 nanometers or less, in some embodiments from about 1 to about 5 nanometers, and in some embodiments, from about 2 to about 4 nanometers. The pore sizes and total pore volume may be measured using nitrogen adsorption and analyzed by the Barrett-Joyner-Halenda ("BJH") technique.

If desired, binders may be present in an amount of about 60 parts or less, in some embodiments 40 parts or less, and in some embodiments, from about 1 to about 25 parts per 100 parts of carbon in the first and/or second carbonaceous coatings. Binders may, for example, constitute about 15 wt. % or less, in some embodiments about 10 wt. % or less, and in some embodiments, from about 0.5 wt. % to about 5 wt. % of the total weight of a carbonaceous coating. Any of a variety of suitable binders can be used in the electrodes. For instance, water-insoluble organic binders may be employed in certain embodiments, such as styrene-butadiene copolymers, polyvinyl acetate homopolymers, vinyl-acetate ethylene copolymers, vinyl-acetate acrylic copolymers, ethylene-vinyl chloride copolymers, ethylene-vinyl chloride-vinyl acetate terpolymers, acrylic polyvinyl chloride polymers, acrylic polymers, nitrile polymers, fluoropolymers such as polytetrafluoroethylene or polyvinylidene fluoride, polyolefins, etc., as well as mixtures thereof. Water-soluble organic binders may also be employed, such as polysaccharides and derivatives thereof. In one particular embodiment, the polysaccharide may be a nonionic cellulosic ether, such as alkyl cellulose ethers (e.g., methyl cellulose and ethyl cellulose); hydroxyalkyl cellulose ethers (e.g., hydroxyethyl cellulose, hydroxypropyl cellulose, hydroxypropyl hydroxybutyl cellulose, hydroxyethyl hydroxypropyl cellulose, hydroxyethyl hydroxybutyl cellulose, hydroxyethyl hydroxypropyl hydroxybutyl cellulose, etc.); alkyl hydroxyalkyl cellulose ethers (e.g., methyl hydroxyethyl cellulose, methyl hydroxypropyl cellulose, ethyl hydroxyethyl cellulose, ethyl hydroxypropyl cellulose, methyl ethyl hydroxyethyl cellulose and methyl ethyl hydroxypropyl cellulose); carboxyalkyl cellulose ethers (e.g., carboxymethyl cellulose); and so forth, as well as protonated salts of any of the foregoing, such as sodium carboxymethyl cellulose.

Other materials may also be employed within an activated carbon layer of the first and/or second carbonaceous coatings and/or within other layers of the first and/or second carbonaceous coatings. For example, in certain embodiments, a conductivity promoter may be employed to further increase electrical conductivity. Exemplary conductivity promoters may include, for instance, carbon black, graphite (natural or artificial), graphite, carbon nanotubes, nanowires or nanotubes, metal fibers, graphenes, etc., as well as mixtures thereof. Carbon black is particularly suitable. When employed, conductivity promoters typically constitute about 60 parts or less, in some embodiments 40 parts or less, and in some embodiments, from about 1 to about 25 parts per 100 parts of the activated carbon particles in a carbonaceous coating. Conductivity promotes may, for example, constitute about 15 wt. % or less, in some embodiments about 10 wt. % or less, and in some embodiments, from about 0.5 wt. % to about 5 wt. % of the total weight of a carbonaceous coating. Activated carbon particles likewise typically constitute 85 wt. % or more, in some embodiments about 90 wt. % or more, and in some embodiments, from about 95 wt. % to about 99.5 wt. % of a carbonaceous coating.

The particular manner in which a carbonaceous coating is applied to a current collector may vary, such as printing (e.g., rotogravure), spraying, slot-die coating, drop-coating, dip-coating, etc. Regardless of the manner in which it is applied, the resulting electrode is typically dried to remove moisture from the coating, such as at a temperature of about 100° C. or more, in some embodiments about 200° C. or more, and in some embodiments, from about 300° C. to about 500° C. The electrode may also be compressed (e.g., calendered) to optimize the volumetric efficiency of the ultracapacitor. After any optional compression, the thickness of each carbonaceous coating may generally vary based on the desired electrical performance and operating range of the ultracapacitor. Typically, however, the thickness of a coating is from about 20 to about 200 micrometers, 30 to about 150 micrometers, and in some embodiments, from about 40 to about 100 micrometers. Coatings may be present on one or both sides of a current collector. Regardless, the thickness of the overall electrode (including the current collector and the carbonaceous coating(s) after optional compression) is typically within a range of from about 20 to about 350 micrometers, in some embodiments from about 30 to about 300 micrometers, and in some embodiments, from about 50 to about 250 micrometers.

The electrode assembly also typically contains a separator that is positioned between the first and second electrodes. If desired, other separators may also be employed in the electrode assembly. For example, one or more separators may be positioned over the first electrode, the second electrode, or both. The separators enable electrical isolation of one electrode from another to help prevent an electrical short, but still allow transport of ions between the two electrodes. In certain embodiments, for example, a separator may be employed that includes a cellulosic fibrous material (e.g., airlaid paper web, wet-laid paper web, etc.), nonwoven fibrous material (e.g., polyolefin nonwoven webs), woven fabrics, film (e.g., polyolefin film), etc. Cellulosic fibrous materials are particularly suitable for use in the ultracapacitor, such as those containing natural fibers, synthetic fibers, etc. Specific examples of suitable cellulosic fibers for use in the separator may include, for instance, hardwood pulp fibers, softwood pulp fibers, rayon fibers, regenerated cellulosic fibers, etc. Regardless of the particular materials employed, the separator typically has a thickness of from about 5 to about 150 micrometers, in some embodiments from about 10 to about 100 micrometers, and in some embodiments, from about 20 to about 80 micrometers.

The manner in which the components of the electrode assembly are combined together may vary. For example, the electrodes and separator may be initially folded, wound, stacked, or otherwise contacted together to form an electrode assembly. In one particular embodiment, the electrodes, separator, and optional electrolyte may be wound into an electrode assembly having a "jelly-roll" configuration.

To form an ultracapacitor, an electrolyte is placed into ionic contact with the first electrode and the second electrode before, during, and/or after the electrodes and separator are combined together to form the electrode assembly. The electrolyte is generally nonaqueous in nature and thus contains at least one nonaqueous solvent. To help extend the operating temperature range of the ultracapacitor, it is typically desired that the nonaqueous solvent have a relatively high boiling temperature, such as about 150° C. or more, in some embodiments about 200° C. or more, and in some embodiments, from about 220° C. to about 300° C. Particularly suitable high boiling point solvents may include, for instance, cyclic carbonate solvents, such as ethylene carbonate, propylene carbonate, butylene carbonate, vinylene carbonate, etc. Of course, other nonaqueous solvents may also be employed, either alone or in combination with a cyclic carbonate solvent. Examples of such solvents may include, for instance, open-chain carbonates (e.g., dimethyl carbonate, ethyl methyl carbonate, diethyl carbonate, etc.), aliphatic monocarboxylates (e.g., methyl acetate, methyl propionate, etc.), lactone solvents (e.g., butyrolactone valerolactone, etc.), nitriles (e.g., acetonitrile, glutaronitrile, adiponitrile, methoxyacetonitrile, 3-methoxypropionitrile, etc.), amides (e.g., N,N-dimethylformamide, N,N-diethylacetamide, N-methylpyrrolidinone), alkanes (e.g., nitromethane, nitroethane, etc.), sulfur compounds (e.g., sulfolane, dimethyl sulfoxide, etc.); and so forth.

The electrolyte may also contain at least one ionic liquid, which is dissolved in the nonaqueous solvent. While the concentration of the ionic liquid can vary, it is typically desired that the ionic liquid is present at a relatively high concentration. For example, the ionic liquid may be present in an amount of about 0.8 moles per liter (M) of the electrolyte or more, in some embodiments about 1.0 M or more, in some embodiments about 1.2 M or more, and in some embodiments, from about 1.3 to about 1.8 M.

Figure 6:
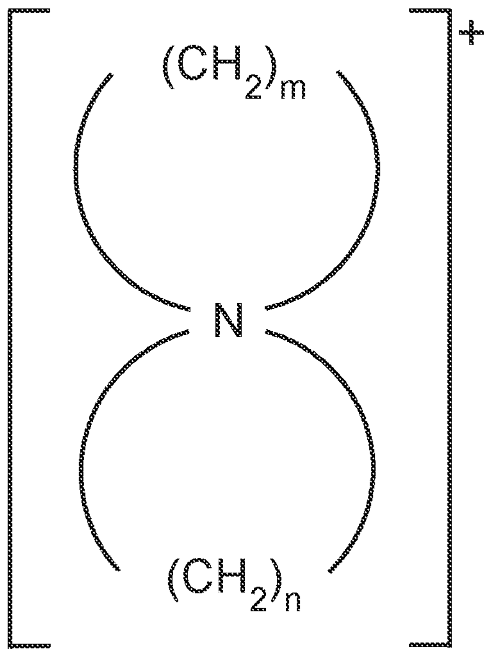
FIG. 6 depicts a chemical structure of a compound according to example embodiments of the present disclosure.

The ionic liquid is generally a salt having a relatively low melting temperature, such as about 400° C. or less, in some embodiments about 350° C. or less, in some embodiments from about 1° C. to about 100° C., and in some embodiments, from about 5° C. to about 50° C. The salt contains a cationic species and counterion. The cationic species contains a compound having at least one heteroatom (e.g., nitrogen or phosphorous) as a "cationic center." Examples of such heteroatomic compounds include, for instance, unsubstituted or substituted organoquaternary ammonium compounds, such as ammonium (e.g., trimethylammonium, tetraethylammonium, etc.), pyridinium, pyridazinium, pyramidinium, pyrazinium, imidazolium, pyrazolium, oxazolium, triazolium, thiazolium, quinolinium, piperidinium, pyrrolidinium, quaternary ammonium spiro compounds in which two or more rings are connected together by a spiro atom (e.g., carbon, heteroatom, etc.), quaternary ammonium fused ring structures (e.g., quinolinium, isoquinolinium, etc.), and so forth. In one particular embodiment, for example, the cationic species may be an N-spirobicyclic compound, such as symmetrical or asymmetrical N-spirobicyclic compounds having cyclic rings. One example of such a compound has the structure depicted in FIG. 6. As shown, the structure in FIG. 6 includes variables, m and n. The variables, m and n, are independently a number from 3 to 7, and in some embodiments, from 4 to 5 (e.g., pyrrolidinium or piperidinium).

Suitable counterions for the cationic species may likewise include halogens (e.g., chloride, bromide, iodide, etc.); sulfates or sulfonates (e.g., methyl sulfate, ethyl sulfate, butyl sulfate, hexyl sulfate, octyl sulfate, hydrogen sulfate, methane sulfonate, dodecylbenzene sulfonate, dodecylsulfate, trifluoromethane sulfonate, heptadecafluorooctanesulfonate, sodium dodecylethoxysulfate, etc.); sulfosuccinates; amides (e.g., dicyanamide); imides (e.g., bis (pentafluoroethyl-sulfonyl)imide, bis (trifluoromethylsulfonyl)imide, bis(trifluoromethyl)imide, etc.); borates (e.g., tetrafluoroborate, tetracyanoborate, bis [oxalato]borate, bis[salicylato]borate, etc.); phosphates or phosphinates (e.g., hexafluorophosphate, diethylphosphate, bis(pentafluoroethyl)phosphinate, tris(pentafluoroethyl)-trifluorophosphate, tris(nonafluorobutyl)trifluorophosphate, etc.); antimonates (e.g., hexafluoroantimonate); aluminates (e.g., tetrachloroaluminate); fatty acid carboxylates (e.g., oleate, isostearate, pentadecafluorooctanoate, etc.); cyanates; acetates; and so forth, as well as combinations of any of the foregoing.

Several examples of suitable ionic liquids may include, for instance, spiro-(1,1')-bipyrrolidinium tetrafluoroborate, triethylmethyl ammonium tetrafluoroborate, tetraethyl ammonium tetrafluoroborate, spiro-(1,1')-bipyrrolidinium iodide, triethylmethyl ammonium iodide, tetraethyl ammonium iodide, methyltriethylammonium tetrafluoroborate, tetrabutylammonium tetrafluoroborate, tetraethylammonium hexafluorophosphate, etc.

As noted above, the ultracapacitor also contains a housing within which the electrode assembly and electrolyte are retained and optionally hermetically sealed. The nature of the housing may vary as desired. In one embodiment, for example, the housing may contain a metal container ("can"), such as those formed from tantalum, niobium, aluminum, nickel, hafnium, titanium, copper, silver, steel (e.g., stainless), alloys thereof, composites thereof (e.g., metal coated with electrically conductive oxide), and so forth. Aluminum is particularly suitable for use in the present disclosure. The metal container may have any of a variety of different shapes, such as cylindrical, D-shaped, etc. Cylindrically-shaped containers are particularly suitable.

In another embodiment, for example, the housing may be in the form of a flexible package that encloses the components of the ultracapacitor. The package generally includes a substrate that extends between two ends and has edges wherein the ends, as well as the portions of both sides that overlap, are fixedly and sealingly abutted against one another (e.g., by heat welding). In this manner, the electrolyte can be retained within the package. The substrate typically has a thickness within the range of from about 20 micrometers to about 1,000 micrometers, in some embodiments from about 50 micrometers to about 800 micrometers, and in some embodiments, from about 100 micrometers to about 600 micrometers.

The substrate may contain any number of layers desired to achieve the desired level of barrier properties, such as 1 or more, in some embodiments 2 or more, and in some embodiments, from 2 to 4 layers. Typically, the substrate contains a barrier layer, which may include a metal, such as aluminum, nickel, tantalum, titanium, stainless steel, etc. Such a barrier layer is generally impervious to the electrolyte so that it can inhibit leakage thereof, and also generally impervious to water and other contaminants. If desired, the substrate may also contain an outer layer that serves as a protective layer for the package. In this manner, the barrier layer is positioned between the outer layer and the electrode assembly. The outer layer may, for instance, be formed from a polymer film, such as those formed from a polyolefin (e.g., ethylene copolymers, propylene copolymers, propylene homopolymers, etc.), polyesters, etc. Particularly suitable polyester films may include, for example, polyethylene terephthalate, polyethylene naphthalate, polybutylene terephthalate, etc.

If desired, the substrate may also contain an inner layer that is positioned between the electrode assembly and the barrier layer. In certain embodiments, the inner layer may contain a heat-sealable polymer. Suitable heat-sealable polymers may include, for instance, vinyl chloride polymers, vinyl chloridine polymers, ionomers, etc., as well as combinations thereof. Ionomers are particularly suitable. In one embodiment, for instance, the ionomer may be a copolymer that contains an α-olefin and (meth)acrylic acid repeating unit. Specific α-olefins may include ethylene, propylene, 1-butene, 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Ethylene is particularly suitable. As noted, the copolymer may also a (meth)acrylic acid repeating unit. As used herein, the term "(meth)acrylic" includes acrylic and methacrylic monomers, as well as salts or esters thereof, such as acrylate and methacrylate monomers. Examples of such (meth) acrylic monomers may include methyl acrylate, ethyl acrylate, n-propyl acrylate, i-propyl acrylate, n-butyl acrylate, s-butyl acrylate, i-butyl acrylate, t-butyl acrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, methacrylate, n-amyl methacrylate, n-hexyl methacrylate, amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. Typically, the α-olefin/(meth) acrylic acid copolymer is at least partially neutralized with a metal ion to form the ionomer. Suitable metal ions may include, for instance, alkali metals (e.g., lithium, sodium, potassium, etc.), alkaline earth metals (e.g., calcium, magnesium, etc.), transition metals (e.g., manganese, zinc, etc.), and so forth, as well as combinations thereof. The metal ions may be provided by an ionic compound, such as a metal formate, acetate, nitrate, carbonate, hydrogen carbonate, oxide, hydroxide, alkoxide, and so forth.

Within the module, the manner in which the ultracapacitors are connected may vary. For example, the ultracapacitors may be connected using an interconnect that attaches to or connects the respective terminals of the ultracapacitors. The interconnect may be made of a conductive material, such as a conductive metal. In one embodiment, the interconnect may be relatively flat or may be one having an increased surface area. Regarding the latter, the interconnect may have projections/protrusions or may also be formed from wires, braids, coils, etc. In this regard, the specific dimensions and configuration of the interconnects is not necessarily limited. Regardless of its form, any of a variety of different conductive materials may be employed, such as copper, tin, nickel, aluminum, etc., as well as alloys and/or coated metals. If desired, the conductive material may optionally be insulated with a sheath material.

The ultracapacitors may be electrically connected together in series or in parallel, depending on the particular properties desired. For instance, in one particular embodiment, the ultracapacitors may be electrically connected in series such that a terminal of a certain polarity (e.g., positive) of one ultracapacitor is connected to a terminal of opposite polarity (e.g., negative) of another ultracapacitor. For instance, the positive terminal may extend from a top portion of the first ultracapacitor and the negative terminal may extend from a bottom portion of the second ultracapacitor.

Ultracapacitors and modules containing them can be employed to store large amounts of electrical charge. As a result, the modules and ultracapacitors of the present disclosure can be employed in a variety of applications. For instance, they can be used in a variety of energy applications including, but not limited to, wind turbines, solar turbines, solar panels, and fuel cells. In addition, they can also be used in a variety of transportation applications including, but not limited to, vehicles (e.g., battery propelled electric vehicles, hybrid electric vehicles including buses, engine starts, power and braking recuperation systems, etc.), trains and trams (e.g., maglev trains, track switching, starter systems, etc.), and aerospace (e.g., actuators for doors, evacuation slides, etc.). They also have a variety of industrial applications including automation (e.g., robotics, etc.), vehicles (e.g., fork lifts, cranes, electric carts, etc.). They also have a variety of applications in consumer electronics (e.g., portable media players, hand-held devices, GPS, digital cameras, etc.), computers (e.g., laptop computers, PDAs, etc.), and communications systems. The modules and ultracapacitors may also have a variety of military applications (e.g., motor startups for tanks and submarines, phased array radar antennae, laser power supplies, radio communications, avionics display and instrumentation, GPS guidance, etc.) and medical applications (e.g., defibrillators, etc.).

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A system for balancing ultracapacitors, the system comprising:

a plurality of switching devices comprising a first pair of the switching devices including a first switching device and a second switching device and a second pair of the switching devices including a third switching device and a fourth switching device, a balancing circuit comprising a single balancing capacitor, wherein the balancing circuit is directly connected to the first pair of the switching devices and the second pair of switching devices;

a control circuit communicatively coupled to each of the plurality of switching devices, the control circuit configured to:

control operation of the first pair of the switching devices to couple the balancing capacitor across a first ultracapacitor of a plurality of ultracapacitors to transfer an electrical charge from the first ultracapacitor to the balancing capacitor, the electrical charge being an amount needed to make a voltage across the first ultracapacitor and a voltage across a second ultracapacitor be within 10%;

control operation of the second pair of the switching devices that is different than the first pair to couple the balancing capacitor across the second ultracapacitor of the plurality of ultracapacitors to transfer at least a portion of the electrical charge from the balancing capacitor to the second ultracapacitor, the electrical charge being an amount needed to make the voltage across the first ultracapacitor and the voltage across the second ultracapacitor be within 10%;

control operation of the first pair of the switching devices to decouple the balancing capacitor from the first ultracapacitor subsequent to the electrical charge being transferred from the first ultracapacitor to the balancing capacitor, and control operation of the second pair of the switching devices to decouple the balancing capacitor from the second ultracapacitor subsequent to the at least a portion of the electrical charge being transferred from the balancing capacitor to the second ultracapacitor, wherein the first ultracapacitor has an electrical charge greater than the second ultracapacitor prior to the at least a portion of the electrical charge being transferred from the balancing capacitor to the second ultracapacitor, and wherein the balancing capacitor comprises an ultracapacitor that is separate from the plurality of ultracapacitors and has a capacitance that is smaller than a capacitance of each of the plurality of ultracapacitors.

2. The system of claim 1, wherein the plurality of ultracapacitors are coupled to one another in series.

3. The system of claim 1, wherein each of the plurality of switching devices comprises a transistor.

4. The system of claim 1, wherein a combined total number of switching devices in the plurality of switching devices is greater than a combined total number of ultracapacitors in the plurality of ultracapacitors.

5. A method for balancing ultracapacitors, the method comprising:

controlling operation of a first pair of switching devices including a first switching device and a second switching device to couple a balancing circuit across a first ultracapacitor of a plurality of ultracapacitors, wherein the balancing circuit comprises a single balancing capacitor and is directly connected to the first pair of switching devices and a second pair of switching devices that is different than the first pair of switching devices;

discharging the first ultracapacitor to transfer electrical charge from the first ultracapacitor to the balancing capacitor when the balancing capacitor is coupled across the first ultracapacitor via the first pair of switching devices;

subsequent to discharging the first ultracapacitor to transfer the electrical charge to the balancing capacitor, controlling operation of the second pair of switching devices, the second pair of switching devices including a third switching device and a fourth switching device to couple the balancing capacitor across a second ultracapacitor of the plurality of ultracapacitors;

discharging the balancing capacitor to transfer at least a portion of the electrical charge to the second ultracapacitor when the balancing capacitor is coupled across the second ultracapacitor via the second pair of switching devices;

controlling operation of the first pair of switching devices to decouple the balancing capacitor from the first ultracapacitor in response to discharging the first ultracapacitor to transfer the electrical charge from the first ultracapacitor to the balancing capacitor, and controlling operation of the second pair of switching devices to decouple the balancing capacitor from the second ultracapacitor in response to discharging the balancing capacitor to transfer the at least a portion of the electrical charge from the balancing capacitor to the second ultracapacitor, wherein the first ultracapacitor has an electrical charge greater than the second ultracapacitor prior to the at least a portion of the electrical charge being transferred from the balancing capacitor to the second ultracapacitor, wherein the at least a portion of the electrical charge is an amount to make a first voltage across the first ultracapacitor and a second voltage across the second ultracapacitor to be within 10%;

wherein the balancing capacitor comprises an ultracapacitor that is separate from the plurality of ultracapacitors and has a capacitance that is smaller than a capacitance of at least one of the first ultracapacitor or the second ultracapacitor.

6. The method of claim 5, wherein:

controlling operation of the first pair of switching devices to couple the balancing capacitor across the first ultracapacitor comprises providing, via a control circuit, one or more control signals to each switching device in the first pair of switching devices, the one or more control signals associated with coupling the balancing capacitor across the first ultracapacitor; and controlling operation of the second pair of switching devices to couple the balancing capacitor across the second ultracapacitor comprises providing, via the control circuit, one or more control signals to each switching device in the second pair of switching devices, the one or more control signals associated with coupling the balancing capacitor across the second ultracapacitor.

7. The method of claim 5, wherein the plurality of ultracapacitors are coupled to one another in series.

8. The method of claim 5, wherein each switching device in the first pair of switching devices and the second pair of switching devices comprises a transistor.

9. The method of claim 5, wherein controlling operation of the first pair of switching devices to couple the balancing capacitor to the first ultracapacitor occurs in response to determining the first voltage across the first ultracapacitor is different than the second voltage across the second ultracapacitor.

10. The method of claim 9, wherein:

the first voltage across the first ultracapacitor corresponds to a highest voltage amongst the plurality of ultracapacitors; and the second voltage across the second ultracapacitor corresponds to a lowest voltage amongst the plurality of ultracapacitors.

* * * * *